United States Patent

Dimitrov et al.

(10) Patent No.: US 7,587,809 B2
(45) Date of Patent: Sep. 15, 2009

(54) METHOD FOR FORMING A MR READER WITH REDUCED SHIELD TOPOGRAPHY AND LOW PARASITIC RESISTANCE

(75) Inventors: Dimitar V. Dimitrov, Edina, MN (US); Daniel P. Burbank, Minneapolis, MN (US); Paul E. Anderson, Eden Prairie, MN (US); Richard P. Larson, Brooklyn Park, MN (US); Kenneth P. Naughton, Minneapolis, MN (US); Insik Jin, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1159 days.

(21) Appl. No.: 10/050,236

(22) Filed: Jan. 15, 2002

(65) Prior Publication Data

US 2003/0046807 A1  Mar. 13, 2003

Related U.S. Application Data

(60) Provisional application No. 60/322,311, filed on Sep. 12, 2001.

(51) Int. Cl.
 *G11B 5/187* (2006.01)
 *C23F 1/00* (2006.01)
(52) U.S. Cl. ............... 29/603.12; 29/603.07; 29/603.15; 29/603.18; 360/313; 360/322; 216/42; 216/47
(58) Field of Classification Search ............... 29/603.07, 29/603.08, 603.12, 603.13, 603.15, 603.16, 29/603.18, 603.14; 360/313–315, 324.1, 360/324.11, 324.12, 322, 319; 216/42, 47
See application file for complete search history.

(56) References Cited

U.S. PATENT DOCUMENTS

| | | | | |
|---|---|---|---|---|
| 5,668,688 A | | 9/1997 | Dykes et al. | 360/324.1 |
| 5,722,157 A | * | 3/1998 | Shouji et al. | 29/603.14 |
| 5,847,904 A | * | 12/1998 | Bharthulwar | 360/322 |
| 5,946,167 A | | 8/1999 | Hara et al. | 360/322 |
| 6,032,353 A | * | 3/2000 | Hiner et al. | 29/603.14 |
| 6,055,136 A | * | 4/2000 | Gill et al. | 360/314 |
| 6,085,406 A | * | 7/2000 | Garfunkel et al. | 29/603.14 |
| 6,230,389 B1 | | 5/2001 | Zhu | 29/603.1 |
| 6,262,869 B1 | * | 7/2001 | Lin et al. | 360/324.11 |
| 6,609,948 B1 | * | 8/2003 | Fontana et al. | 29/603.14 X |
| 2002/0067579 A1 | | 6/2002 | Sato | 360/320 |

FOREIGN PATENT DOCUMENTS

JP    2000-76630    *    3/2000

* cited by examiner

*Primary Examiner*—A. Dexter Tugbang
(74) *Attorney, Agent, or Firm*—Kinney & Lange, P.A.

(57) ABSTRACT

A magnetoresistive reader having a sensor, current contacts with low parasitic resistance and a top shield with substantially planar topology is fabricated by first defining a stripe height back edge of the sensor. Next, a reader width of the sensor is defined. The current contacts are deposited to a thickness such that a top surface of the current contacts is substantially level with a top surface of the sensor. The top shield is deposited over the sensor and the current contacts. Defining the stripe height back edge prior to the reader width results in current contacts with low parasitic resistance and inhibits the formation of magnetic domains in the top shield.

24 Claims, 12 Drawing Sheets

METHOD FOR FORMING A MR READER WITH REDUCED SHIELD TOPOGRAPHY AND LOW PARASITIC RESISTANCE

CROSS-REFERENCE TO RELATED APPLICATION(S)

This application claims the priority benefit of a provisional U.S. patent application Ser. No. 60/322,311 of Dimitar V. Dimitrov, Daniel P. Burbank, Paul E. Anderson, Richard P. Larson, Kenneth P. Naughton, and Insik Jin, filed on Sep. 12, 2001 and entitled "SV Reader Design With Reduced Shield Topography and Low Parasitic Resistance."

BACKGROUND OF THE INVENTION

The present invention relates to manufacturing of magnetoresistive spin valve (SV) devices. In particular, the present invention relates to a method of fabricating abutted junction SV heads for longitudinal recording.

A magnetic read head retrieves magnetically-encoded information that is stored on a magnetic medium or disc. The magnetic read head is typically formed of several layers that include a top shield, a bottom shield, and a read sensor positioned between the top and bottom shields. Also positioned between the top and bottom shields, abutting opposite sides of the read sensor, are biasing layers and current contacts. The read sensor is generally a type of magnetoresistive (MR) sensor. The resistance of the MR sensor fluctuates in response to a magnetic field emanating from a magnetic medium when the MR sensor is used in a magnetic read head and positioned near the magnetic medium. By providing a sense current through the MR sensor, the resistance of the MR sensor can be measured and used by external circuitry to decipher the information stored on the magnetic medium.

The spin valve effect is one known way to utilize magnetoresistance. Present abutted junction SV technology utilizes SV stacks with a thickness around 400 angstroms, while a combined thickness of surrounding biasing layers and current contacts is close to 1000 angstroms. This 600 angstrom difference in thickness creates a non-planar top shield topography near the sensor. For SV readers targeted at 100 kTPI and above, this top shield non-planar topography is comparable to the lateral dimensions of the reader. As a result, this non-planar topography presents serious concerns.

First, the top shield is made of soft magnetic material, which tends to break into magnetic domains in regions with corners and non-planar topography. Formation of magnetic domains in the top shield that are in close vicinity to the MR sensor is highly undesirable, because it is expected to be a source of magnetic instability and, thus, increase noise in the reader.

Second, the top and bottom shields need to shield the MR sensor from down-track transitions on the magnetic media and enable adequate electrical pulse-width ($PW_{50}$), which is the width of the pulse signal at 50% peak amplitude, of the MR read sensor. These are achieved when a spacing between the bottom shield and the top shield are at a minimum. Large top shield non-planar topography is expected to compromise the shield-to-shield spacing at the edges of the sensor, thus deteriorating the down-track shielding capability and the $PW_{50}$.

Third, the top and bottom shields need to shield the MR sensor from transitions in adjacent tracks on the magnetic media and provide adequate electrical reader width, which is evaluated by the $MT_{50}$ and $MT_{10}$ values. $MT_{50}$ and $MT_{10}$ values are the width of the pulse signal at 50% and 10% peak amplitude, respectively. Large top shield non-planar topography is expected to allow more flux penetration from the adjacent tracks. This will lead to deteriorated $MT_{50}/MT_{10}$ values or, alternatively, would require narrower physical reader width to achieve the required electrical reader width.

The conventional method of fabricating MR readers first defines a reader width of the MR sensor and then defines a back edge of a stripe height of the MR sensor. As will be explained below, this process creates a region of significantly thinned current contacts behind the stripe height back edge. After lapping an air bearing surface (ABS) of the MR sensor to define a stripe height front edge, the thickness of the remaining part of the current contacts is significantly reduced. Consequently, current supplied to the MR sensor through the current contacts is forced to go through two paths that have high resistance—one is a thick but narrow strip at the ABS, while the other is a wide but thin region extending behind the stripe height back edge. This creates large parasitic resistance. While this large parasitic resistance is within acceptable values when the top shield non-planar topography is 600 angstroms (contacts plus biasing layers equal to 1000 angstroms), it will become very large if the contact thickness is reduced in order to create flat top shields (contact plus biasing layers equal to 400 angstroms). Electronics associated with the MR reader are not optimized for these high resistance levels and redesigning the electronics would be too costly.

Therefore, there is a need for a method of fabricating a MR reader with top shield planar topography. Additionally, the method must be economical and minimize parasitic resistance.

BRIEF SUMMARY OF THE INVENTION

The present invention is a method for fabricating a magnetoresistive reader having a sensor, current contacts with low parasitic resistance and a top shield with substantially planar topology. First, a stripe height back edge of the sensor is defined, and second, a reader width of the sensor is defined. The current contacts are deposited to a thickness such that a top surface of the current contacts is substantially level with a top surface of the sensor. The top shield is deposited over the sensor and the current contacts. Defining the stripe height back edge prior to the reader width results in current contacts with low parasitic resistance and allows for thin contacts and flat top shield, which inhibits the formation of magnetic domains in the top shield.

DETAILED DESCRIPTION

A sensor of an MR reader is formed by defining four critical edges: a front and back edge defining a stripe height of the sensor and side edges defining a width of the sensor (a reader width). Conventionally, the reader width is defined first, followed by definition of the stripe height back edge and then the stripe height front edge. FIGS. 1-5 illustrate steps in a conventional method of forming MR reader 10.

Figure 1:
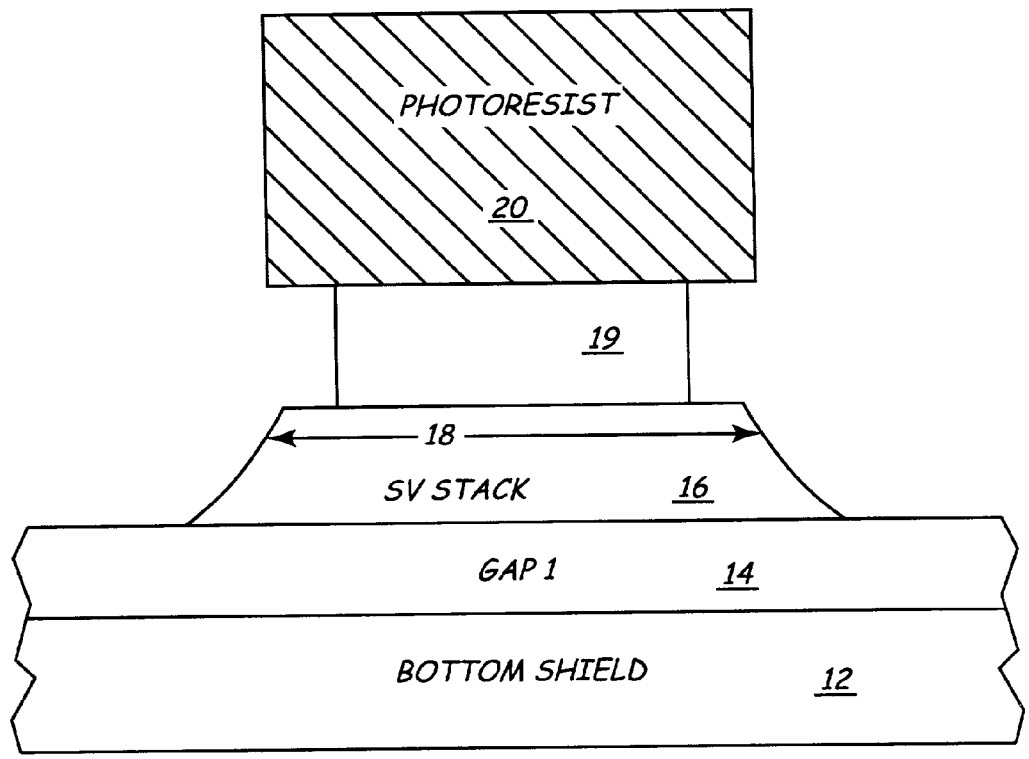
FIGS. 1-5 illustrate steps in a conventional method for forming a MR reader.

FIG. 1 is a cross-sectional view of MR reader 10 in the process of having its reader width defined by the conventional method. MR reader 10 includes bottom shield 12, bottom half-gap 14, SV stack 16 having reader width 18, photoresist release layer (PMGI) or photoresist bridge 19, and photoresist layer 20. Bottom shield 12 is deposited on a wafer (not shown) covered with an appropriate basecoat ($Al_2O_3$ layer) followed by bottom half-gap 14 and then SV stack 16. Bottom half-gap 14 is an insulator that is usually made of $Al_2O_3$. A specific pattern of photoresist layer 20 is suspended over SV stack 16 using photoresist release layer (PMGI) or photoresist bridge 19. A width of photoresist layer 20 adjacent to a desired SV sensor region of SV stack 16 defines reader width 18 of SV stack 16.

The purpose of photoresist layer 20 is to mask regions during the milling process, which removes the material left unprotected. MR reader 10 with reader width 18 defined after the milling process is shown in FIG. 1. At this point, two of the critical edges are defined: the side edges of reader width 18 of SV stack 16.

Figure 2:
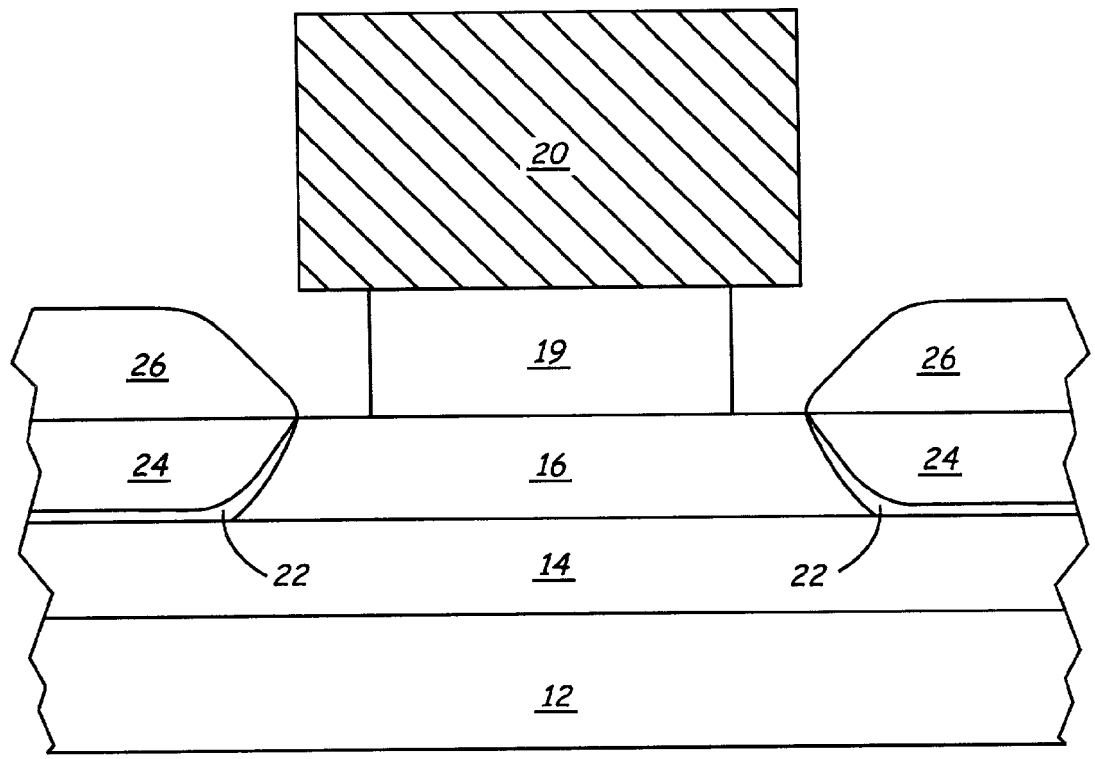

FIG. 2 is a cross-sectional view of MR reader 10 illustrating another step in the conventional method of fabricating MR reader 10. This step involves depositing several layers in an abutting junction configuration adjacent opposite edges of SV stack 16. The specific components may vary, for example a pedestal may be included. In the embodiment shown, permanent magnet seed 22 is deposited, then permanent magnet 24, followed by extended contacts 26. Next, photoresist layer 20 is dissolved (not shown).

Figure 3:
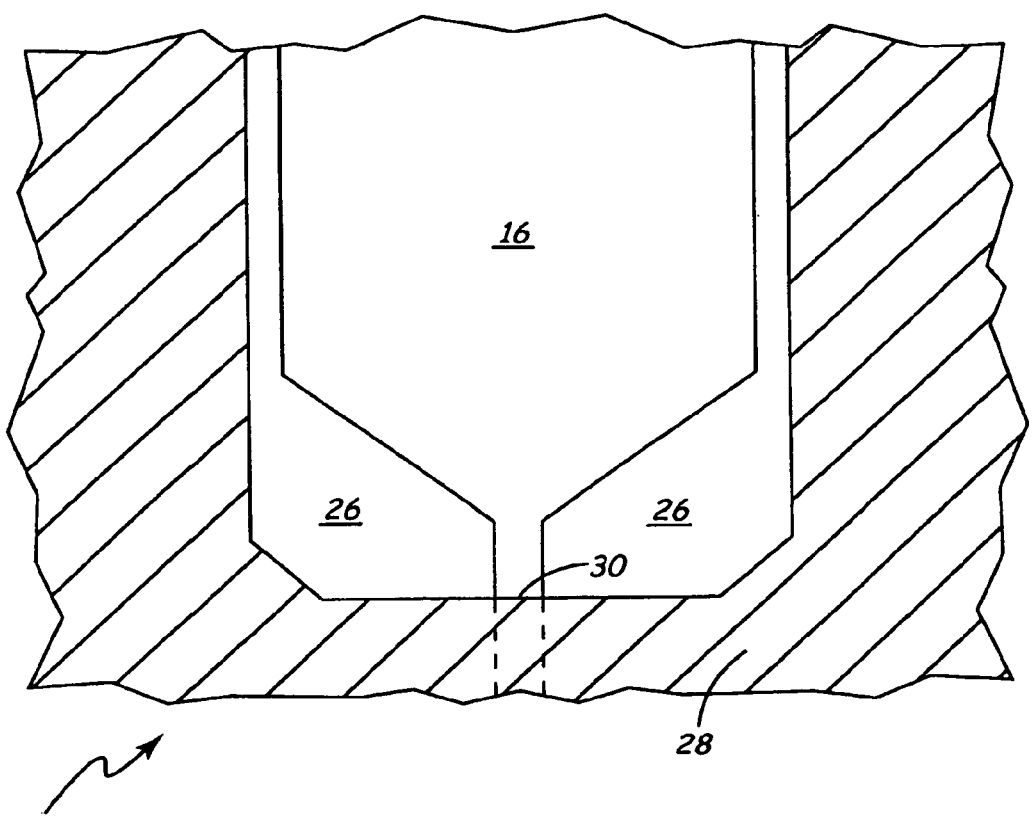

FIG. 3 is a top view of MR reader 10 showing MR reader 10 masked for defining stripe height back edge 30. Photoresist layer 28 masks part of SV stack 16 and contacts 26 but leaves open the area behind desired stripe height back edge 30, which is defined. Stripe height back edge 30 is protected by backfilling the milled area with $Al_2O_3$ or other suitable material, and photoresist layer 28 is subsequently dissolved. The last step involves defining the final critical edge, which is the front edge of the stripe height. Lapping MR reader 10 at the front edge defines the stripe height front edge (or the ABS).

Figure 4:
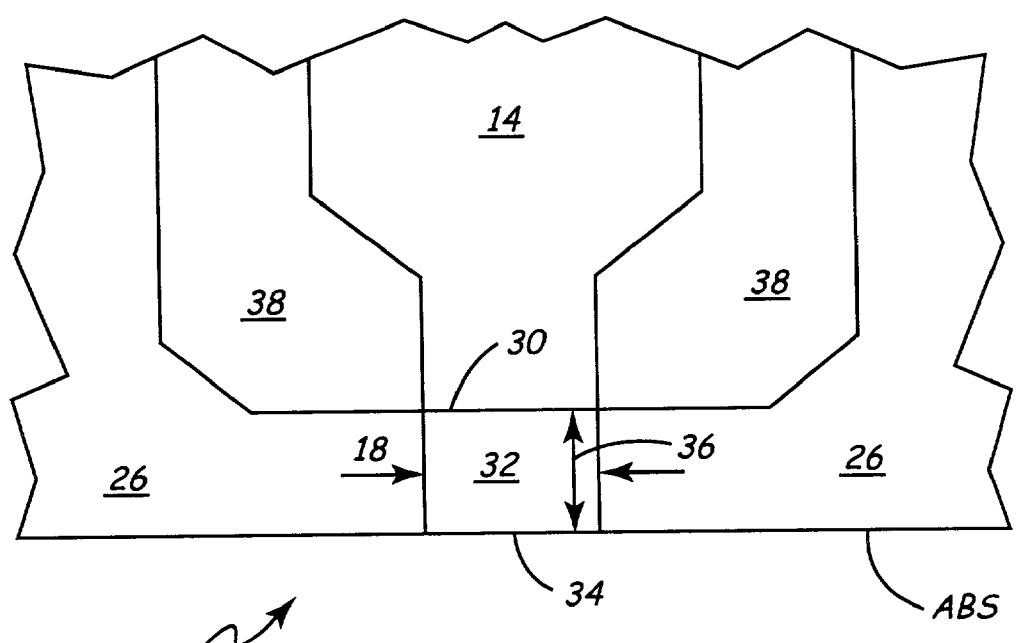

FIG. 4 is a top view of MR reader 10 schematically showing MR reader 10 with defined sensor 32. After lapping the ABS of MR reader 10, sensor 32 is fully defined having reader width 18 and stripe height 36. The second milling process has cleared the exposed SV stack 16 and contacts 26. Bottom half-gap 14 is exposed from underneath SV stack 16. Exposed contacts 26 have been milled to a very minimal thickness represented by milled contacts 38. Contacts 26 now form a thick but narrow region near sensor 32. This configuration leads to large parasitic resistance as current is directed toward sensor 32. The current is forced through contact paths that are thick but narrow (contacts 26) and wide but thin (milled contacts 38).

Figure 5:
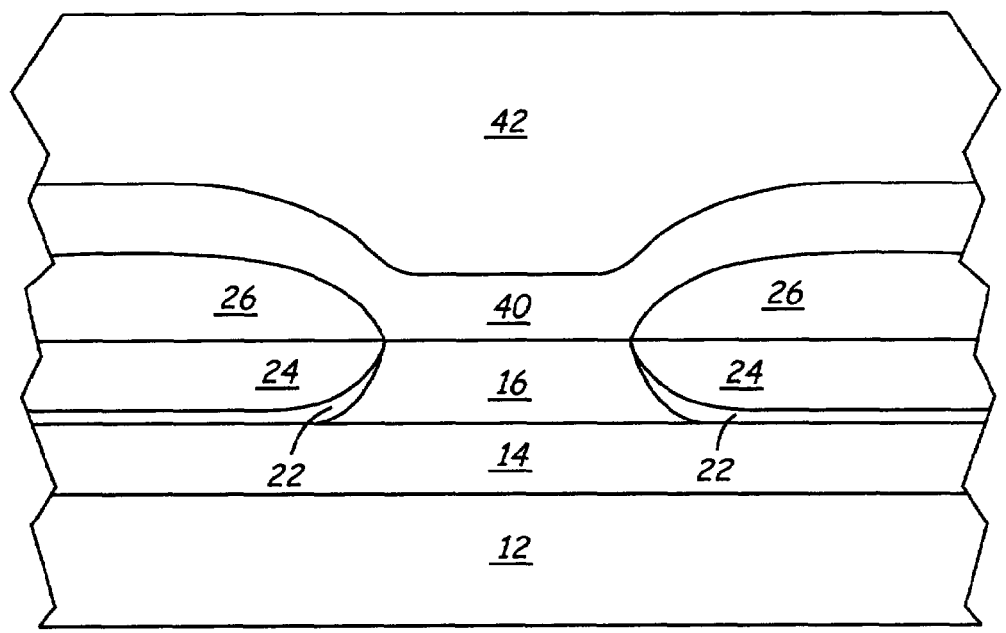
Figure 5:
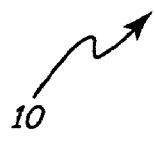

FIG. 5 is a cross-sectional view of finished SV reader 10. Here, top half-gap 40 has been deposited over contacts 26, milled contacts 38 (not shown), and SV stack 16. Top shield 42 is then deposited over top half-gap 40.

As shown schematically, because of the non-planar topography where contacts 26 abut SV stack 16, top shield 42 also has non-planar topography. As previously discussed, this leads to magnetic domains forming in top shield 42 that may interfere with the signal generated by SV reader 10.

One approach to reduce top shield 42 non-planar topography is to use two sets of contacts: a first set that matches SV stack 16 thickness and extends out from sensor 32, and a second set that is much thicker and recessed from sensor 32. With this approach, the non-planar topography of top shield 42 is moved away from sensor 32.

This alternate approach, however, presents two major drawbacks. First, a large increase in resistance is expected, which poses issues for the associated electronics and may increase Johnson noise in the MR reader. Second, the approach requires a second set of contacts which increases the process content, adds to the fabrication cost, and potentially increases the chances for problems that lead to scrapping wafers.

In order to create planar topography in the vicinity of the sensor, it is necessary to thin the current contacts to approximately the SV stack thickness. If reader width 18 definition is performed before stripe height 36 definition, the mill operation to define stripe height back edge 30 will decrease the thickness of the contacts behind the line of back edge 30. The result is a narrow and long strip with large parasitic resistance contribution is series with sensor 32, and the parasitic contribution has very strong dependence on stripe height 36.

Figure 6:
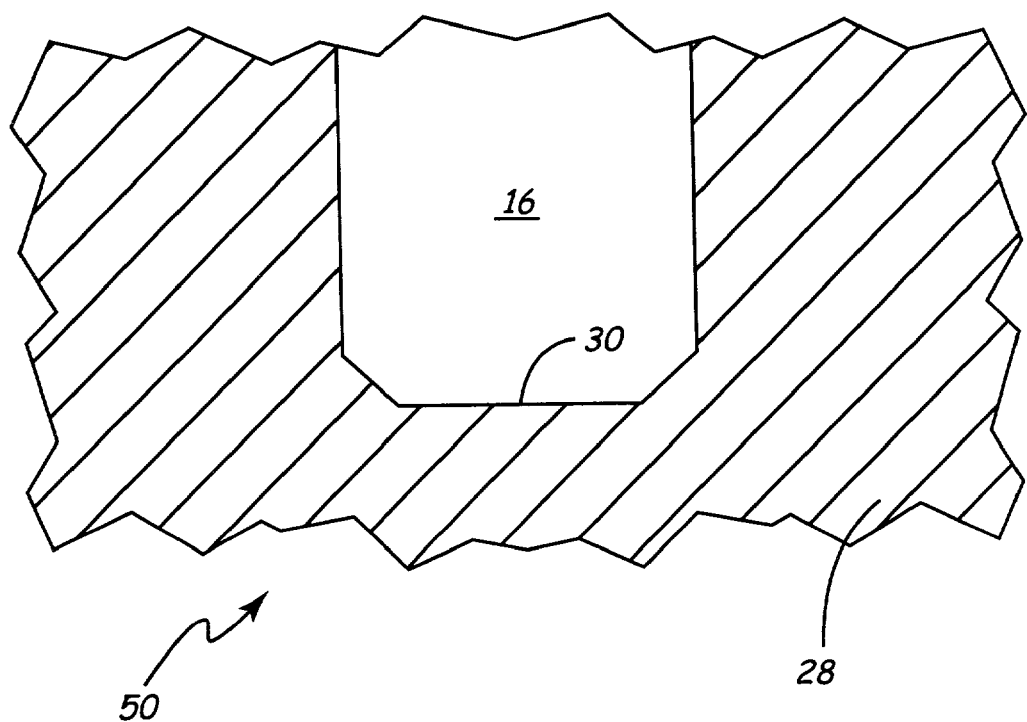
FIGS. 6-9 illustrate steps in accord with the present invention for forming a MR reader.

The method of the present invention illustrated in the FIGS. 6-9 alleviates the problems associated with the previously described conventional techniques. The process begins, as with the conventional method, by depositing bottom shield 12, bottom half-gap 14, and SV stack 16. FIG. 6, which is a top view of MR reader 50, illustrates the step of defining stripe height back edge 30. FIG. 6 shows photoresist layer 28 selectively patterned on SV stack 16, leaving exposed a region of SV stack 16 behind desired stripe height back edge 30 to define stripe height back edge 30. MR reader 50 is milled and bottom half-gap 14 is revealed in the unprotected region. Thus, the first critical edge, stripe height back edge 30, is defined.

Stripe height back edge 30 is backfilled to protect edge 30 and photoresist layer 28 is subsequently dissolved. Preferably the backfill is $Al_3O_2$, and has a thickness that leaves enough insulation after the milling process to define reader width 18. To enable the reader width bridge process, which suspends photoresist layer 20 over SV stack 16 in the region where sensor 32 will be, the backfill should be at about the same level as SV stack 16.

Figure 7:
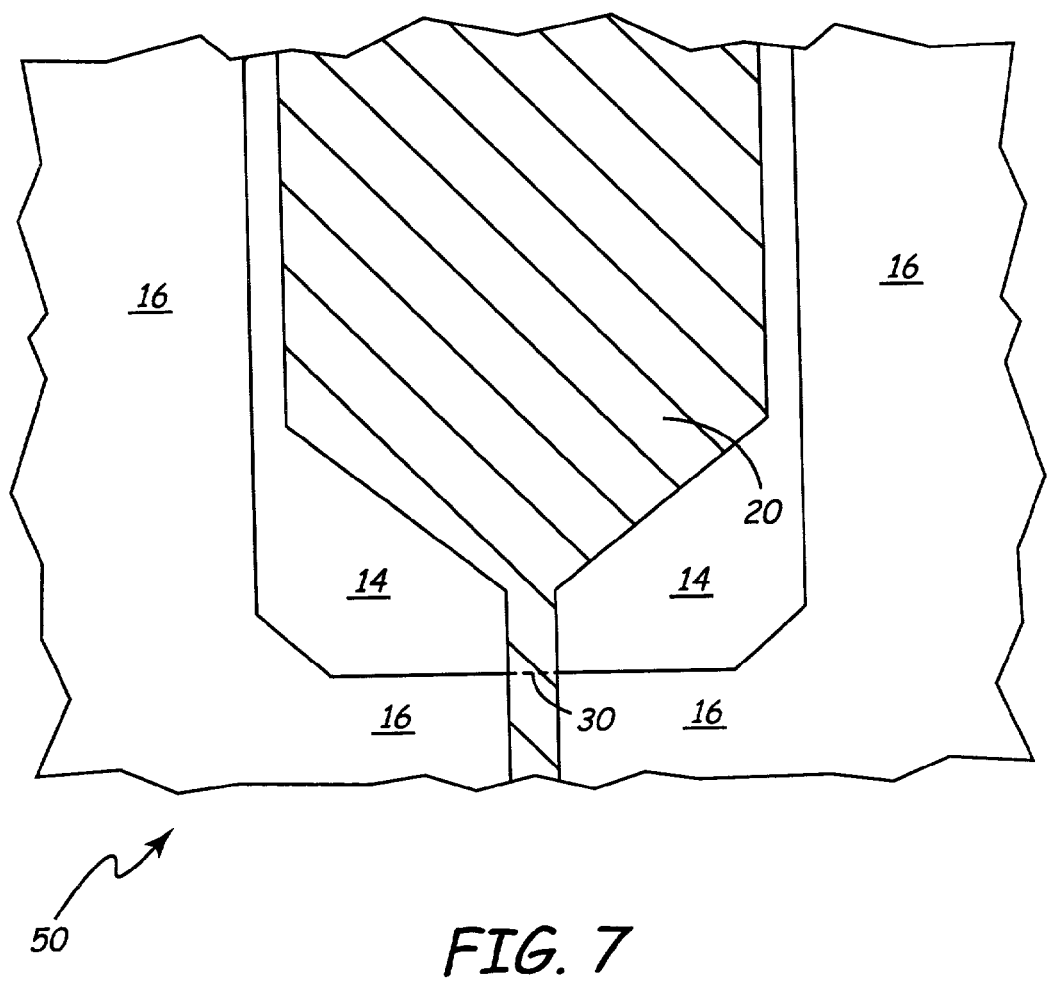

FIG. 7 shows the next step in the process, which is defining reader width 18. FIG. 7 shows MR reader 50 with photoresist layer 20; bottom half-gap 14, which was exposed in the previous mill process; and SV stack 16 with stripe height back edge 30, which was masked in the previous step. Again, photoresist layer 20 serves to define reader width 18 of MR reader 50.

After selective placement of photoresist layer 20, MR reader 50 is milled again to remove an unprotected region of SV stack 16. Photoresist layer 20 remains while contacts 26 are deposited such that a top surface of SV stack 16 extends at a same level as a top surface of contacts 26. Preferably, other materials are deposited prior to contacts 26. These materials may include a pedestal layer, permanent magnet seed, and permanent magnet. Photoresist layer 20 is subsequently dissolved. Reader width 18 is now defined.

To finish MR reader 50, top half-gap 40 is deposited and then top shield 42 is deposited. Stripe height front edge 34 is defined, as in the conventional method, by lapping the ABS of MR reader 50 to finalize definition of all critical edges of sensor 32.

Figure 8:
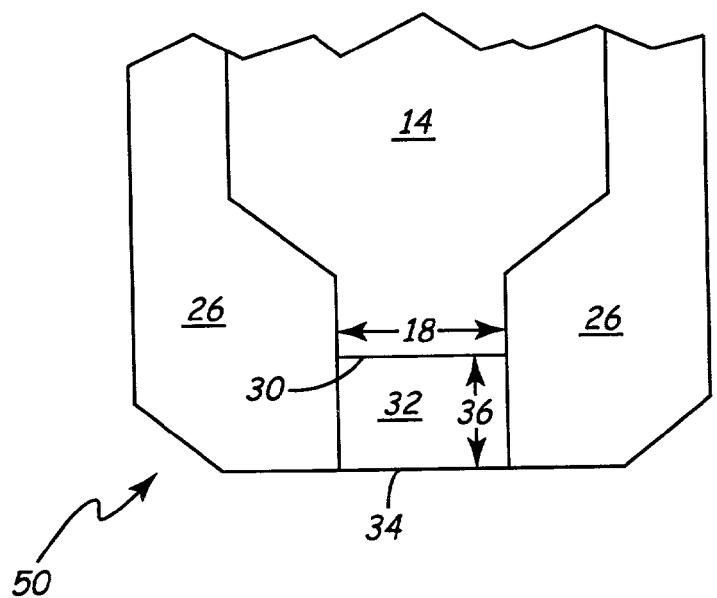
Figure 9:
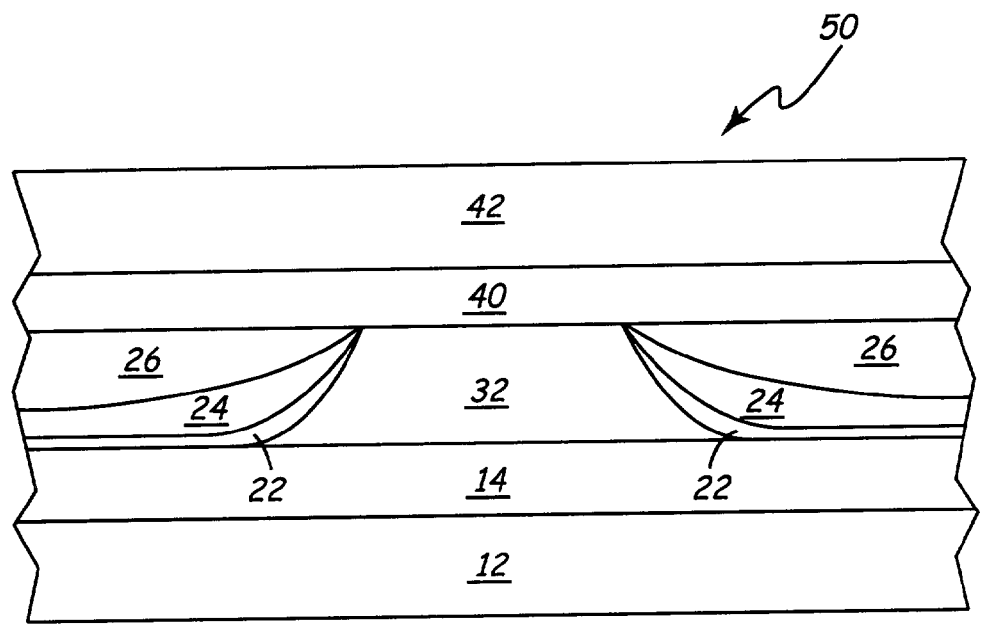

FIGS. 8 and 9 show finished MR reader 50. FIG. 8 is a top view without top gap 40 or top shield 42, while FIG. 9 is a cross-sectional, ABS view of finished SV reader 50. SV reader 50 includes bottom shield 12, bottom gap 14, sensor 32 having reader width 18 and stripe height 36 defined by back and front edges 30 and 34, respectively; permanent magnet seed 22; permanent magnets 24; current contacts 26; top gap 40; and top shield 42. Using the method taught here, contacts 26 have uniform thickness throughout. The wide layer forming contacts 26 has reasonably large (about 400 angstroms) thickness and decreased parasitic resistance to acceptable levels. Additionally, top shield 42 exhibits planar topography since contacts 26 and SV stack 16 have planar topography. The problem of magnetic domains forming and interfering with sensor 32 is reduced because of this planar topography of top shield 42. In addition, only one set of contacts 26 are used, which decreases process time, cost, and scrapped wafers.

Finite element method (FEM) modeling was performed to study the parasitic resistance contribution from the milling process that defines stripe height 36 (Rmill). A SV reader fabricated using the conventional method was compared to a SV reader fabricated using the method of the present invention. In all cases, a top surface of contacts 26 was assumed to be substantially level with a top surface of SV stack 16, which is 400 angstroms. A width of a mill window in photoresist layer 28 (MW), which defines stripe height back edge 30, is a major factor in determining Rmill in the conventional method. Therefore, three different widths were tested: 0.55 µm, 0.75 µm, and 1.0 µm. MW can not be reduced to an arbitrarily low value because of limitations in achieving a straight stripe height back edge 30. Using the best DUV photo process presently available, the minimum width is 0.55 µm. Current 30 Gb/inch$^2$ to 50 Gb/inch$^2$ products use a 1.0 µm width. The examples studied all utilized Rhodium (Rh) or Gold (Au) pedestals, but the pedestals may be formed of other conductive material. Additionally, the SV reader can be formed without pedestals as illustrated above in FIGS. 6-9.

Figure 10A:
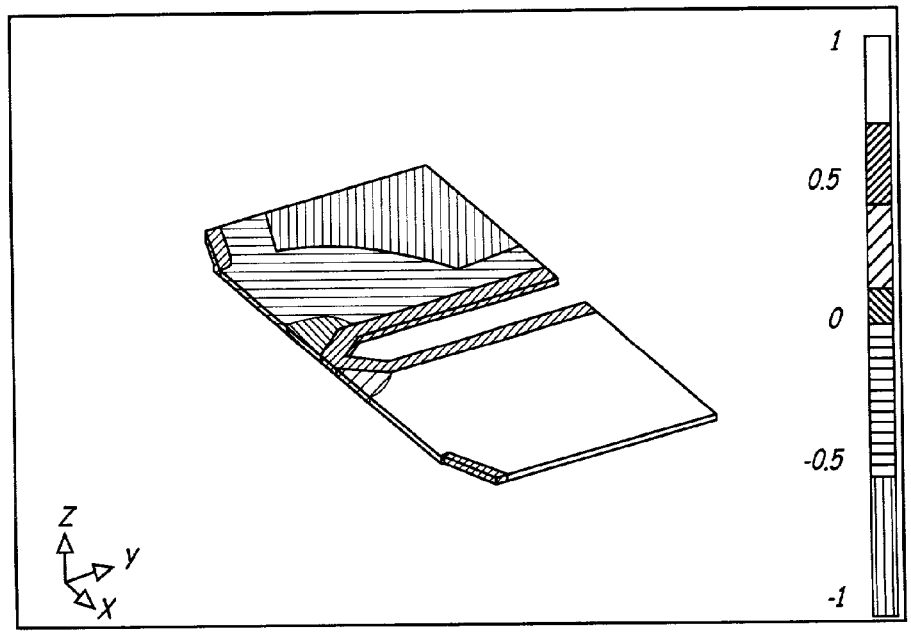
FIGS. 10*a* and 10*b* are electrical potential distribution maps of a MR reader made by the conventional method.
Figure 10B:
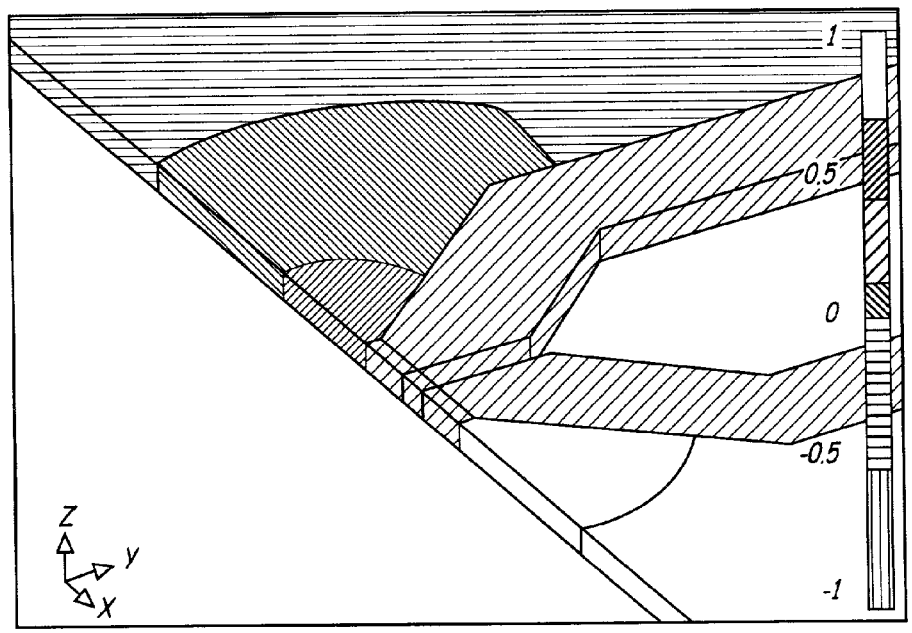

FIGS. 10a and 10b show the electrical potential distribution map of a SV reader fabricated using the conventional method with a Rh pedestal and MW of 0.55 µm. FIG. 10b is an enlarged view of active sensor 32 illustrated in FIG. 10a. Since contacts 26 are thinned by the milling process, current is squeezed through a narrow strip at the ABS causing a large parasitic resistance.

Figure 11A:
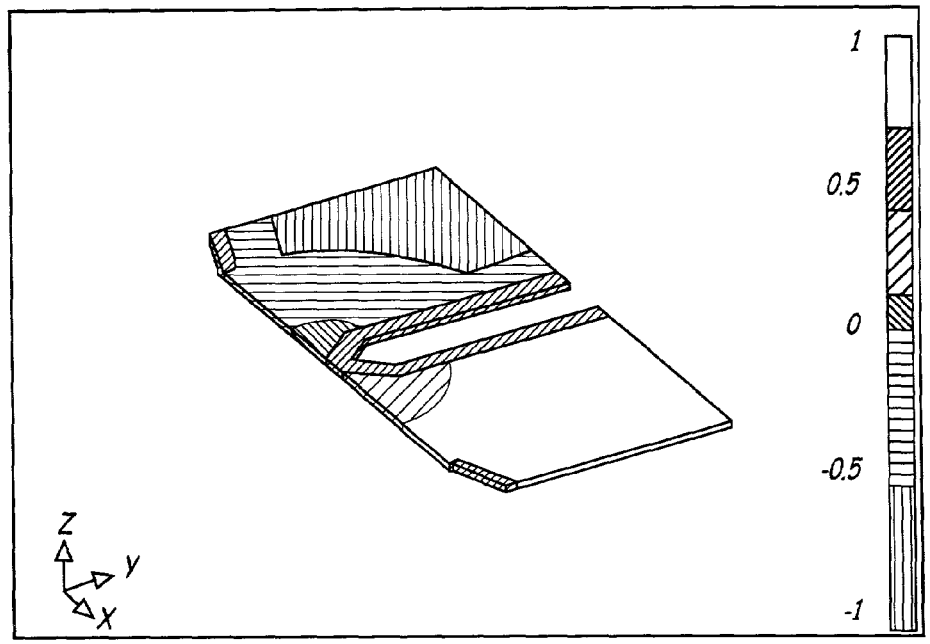
FIGS. 11*a* and 11*b* are electrical potential distribution maps of a MR reader made by the method of the present invention.
Figure 11B:
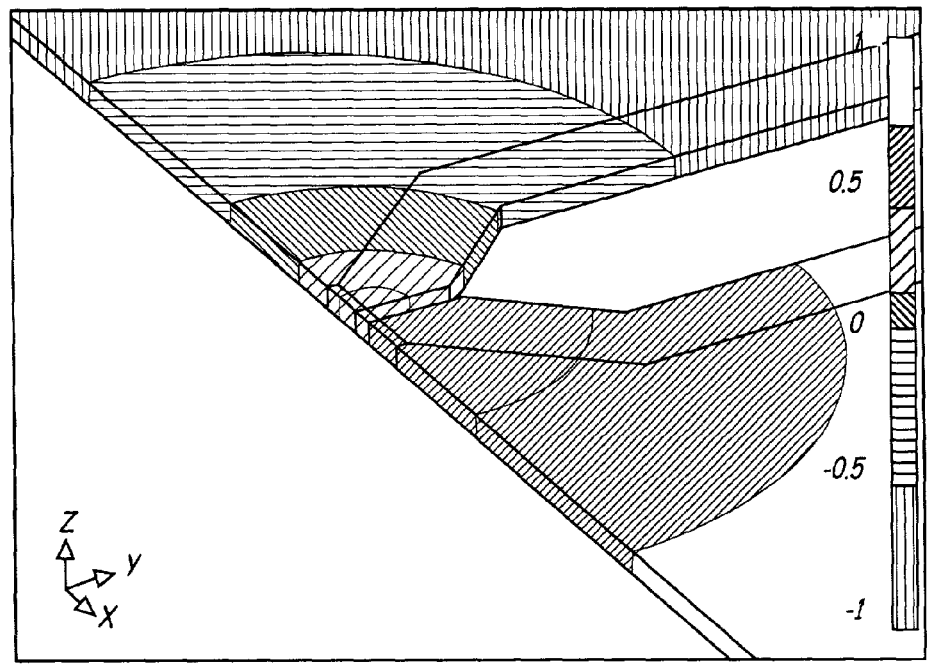

FIGS. 11a and 11b are analogous electrical potential distributions of a SV reader fabricated using the method of the present invention. FIG. 11b is an enlarged view of active sensor 32 illustrated in FIG. 11a. The current is not constrained so drastically, and this insures much lower Rmill. In fact, MW is irrelevant in this case, thus allowing MW to be optimized using other process constraints such as straightness of stripe height back edge 30, shadowing during milling, stripe height back edge 30 backfill process, and photoresist liftoffs.

Figure 12:
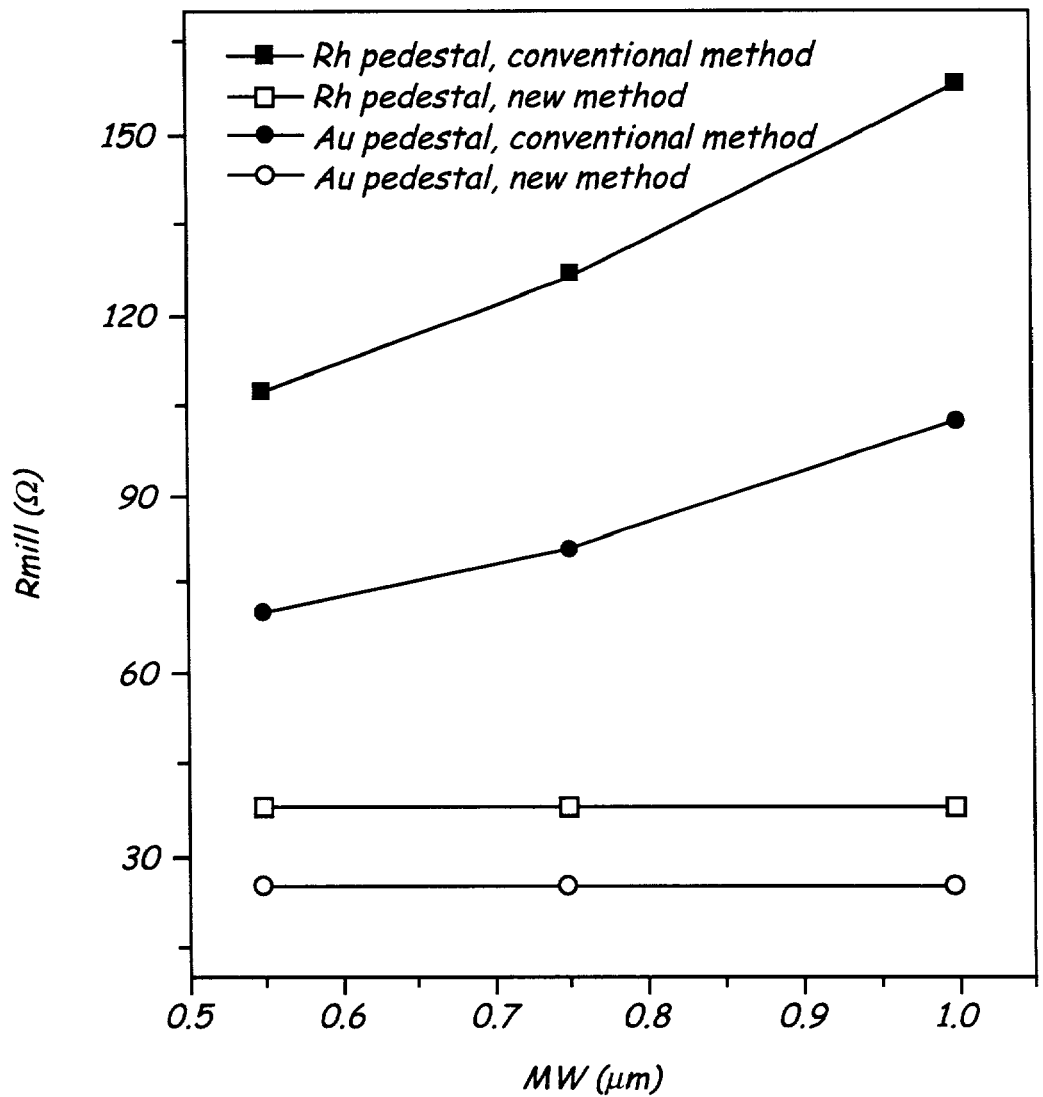
FIG. 12 is a graphical representation comparing a parasitic resistance contribution from the fabrication process (Rmill) to a mill window width (MW) used to fabricate MR readers.

To demonstrate the advantage of using the method of the present invention, Rmill was calculated for a number of cases. The results are presented in FIG. 12. Stripe height 36 is assumed to be 400 angstroms, which is close to the target value for programs between 120-140 kTPI. When using the conventional method and a Rh pedestal, the minimum Rmill is 107Ω and with an Au pedestal, the minimum Rmill is 70Ω. Even the smaller 70Ω value is much larger than the values of Rmill presently used, which are about 20-30Ω and will render head resistances of 115Ω for Au and 150Ω for Rh pedestals.

However, in cases using the method of the present invention, significant improvements are seen. If a Rh pedestal is used, the Rmill is 38Ω. If an Au pedestal is used, the Rmill is 25Ω which is well within the range used in present technology.

Figure 13:
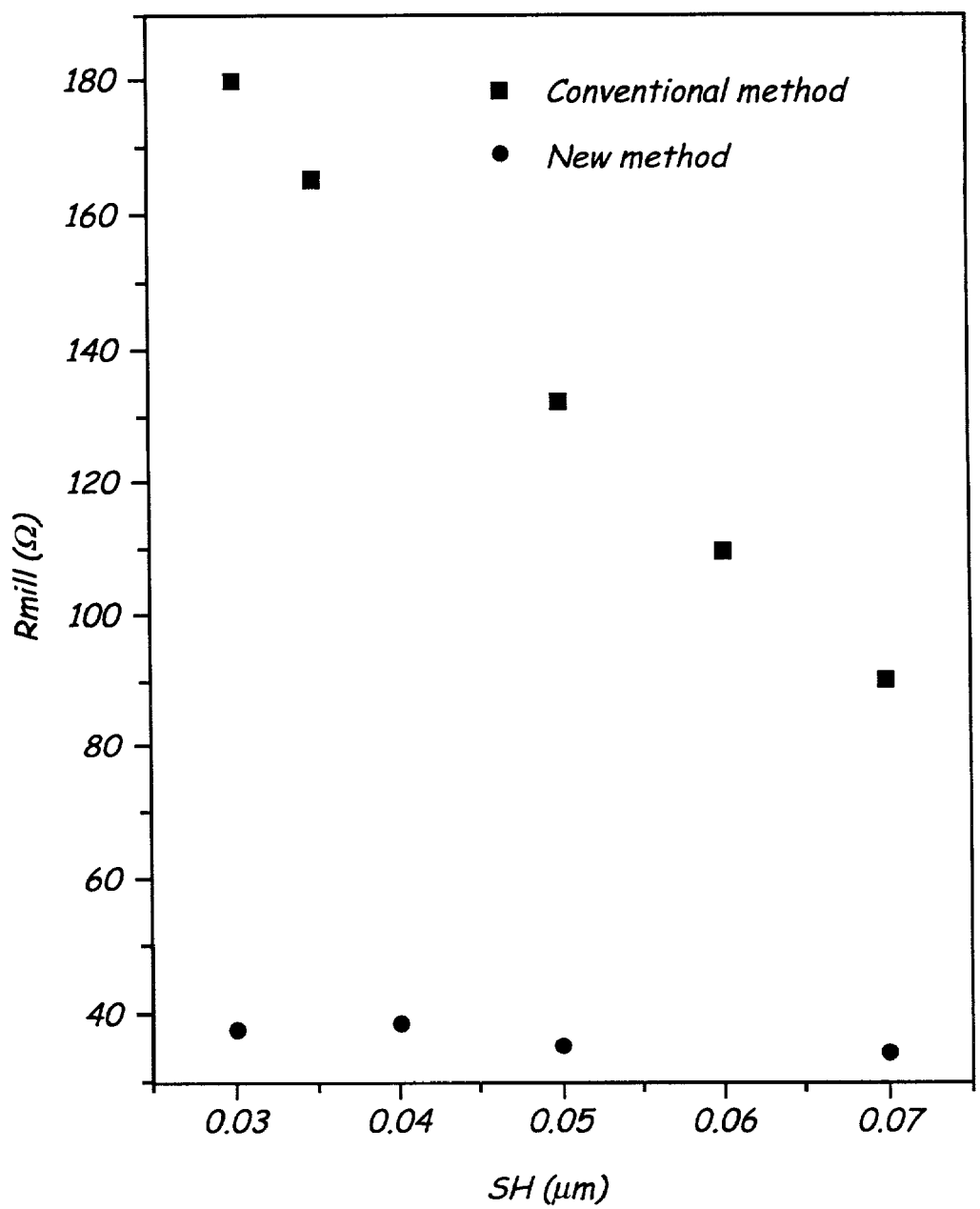
FIG. 13 is a graphical representation comparing Rmill to a stripe height of MR readers.

Another advantage is illustrated in FIG. 13. FIG. 13 shows the results of comparing Rmill as a function of stripe height 36. Here, the pedestals are formed of Rh and MW is 0.75 µm. Using the conventional method to form the SV reader results in a strong inverse correspondence between Rmill and stripe height 36. This naturally leads to a wide distribution in head resistance if using a lap to stripe height slider process or lap to resistance slider process to define stripe height front edge 34. Presently, the lapping processes produce significant variations in stripe height 36. The large variation in head resistance, as well as the large value itself, is not optimal for the design of the associated electronics.

Conversely, when using the method of the present invention to fabricate the SV reader, Rmill has little dependence on stripe height 36. Unlike when using the conventional method, typical variations in stripe height 36 do not substantially change the geometry of contacts 26. Regardless of stripe height, the current still passes through the same wide region and, thus, the small stripe height 36 dependence. In the conventional method, the resulting area that the current passes through is a narrow, long strip along the ABS, and the typical variations in stripe height 36 will strongly affect resistance.

Although the present invention has been described with reference to SV readers, the method of the present invention applies equally to other types of current in plane (CIP) MR readers, including AMR readers.

Although the present invention has been described with reference to preferred embodiments, workers skilled in the art will recognize that changes may be made in form and detail without departing from the spirit and scope of the invention.

The invention claimed is:

1. A method of forming a magnetoresistive reader with planar top shield topography and low parasitic resistance, the method comprising:
    defining a stripe height back edge of a magnetoresistive sensor of the magnetoresistive reader, wherein defining the stripe height back edge of the magnetoresistive sensor comprises:
        depositing a plurality of magnetoresistive sensor layers;
        selectively patterning a first photoresist layer on the magnetoresistive sensor layers, the first photoresist layer leaving exposed a first region of the magnetoresistive sensor layers; and
        removing the exposed first region of the magnetoresistive sensor layers; and
    subsequently defining a reader width of the magnetoresistive sensor, wherein defining the reader width of the magnetoresistive sensor comprises:
        selectively patterning a second photoresist layer on the magnetoresistive sensor layers, the second photoresist layer leaving exposed a second region of the magnetoresistive sensor layers; and
        removing the exposed second region of the magnetoresistive sensor layers.

2. The method of claim 1 and further comprising:
    defining a stripe height front edge of the magnetoresistive sensor layers.

3. The method of claim 2 wherein defining the stripe height front edge of the magnetoresistive sensor comprises:
    lapping an air bearing surface of the magnetoresistive sensor layers.

4. A method of forming a magnetoresistive reader with planar shield topography and low parasitic resistance, the method comprising:
    depositing a stack of magnetoresistive sensor layers;
    selectively patterning a first photoresist layer on the stack of magnetoresistive sensor layers, the first photoresist layer serving to define a stripe height back edge of the magnetoresistive sensor by leaving exposed a first region of the stack of magnetoresistive sensor layers;

removing the exposed first region of the stack of magnetoresistive sensor layers;

removing the first photoresist layer;

selectively patterning a second photoresist layer on the stack of magnetoresistive sensor layers after removal of the first photoresist layer, the second photoresist layer serving to define a reader width of the magnetoresistive sensor by leaving exposed a second region of the stack of magnetoresistive sensor layers;

removing the exposed second region of the stack of magnetoresistive sensor layers;

depositing current contacts such that the current contacts are in electrical contact with opposite edges of the stack of magnetoresistive sensor layers;

removing the second photoresist layer; and lapping an air bearing surface of the magnetoresistive sensor to define a stripe height front edge of the magnetoresistive sensor.

5. The method of claim 4 and further comprising:
backfilling an insulating material into the removed first region prior to the removal of the first photoresist layer.

6. The method of claim 5 wherein the insulating material is $Al_2O_3$.

7. The method of claim 5 wherein the insulating material is deposited to a thickness similar to a thickness of the stack of magnetoresistive sensor layers, such that the insulating layer survives the step of removing the exposed second region.

8. The method of claim 4 wherein a top surface of the current contacts is substantially level with a top surface of the stack of magnetoresistive sensor layers.

9. The method of claim 4 and further comprising:
depositing a top gap layer on the current contacts and on the stack of magnetoresistive sensor layers; and
depositing a top shield layer on the top gap layer.

10. The method of claim 9 wherein the top shield layer is substantially planar.

11. The method of claim 4 wherein a pedestal, a permanent magnet seed, and a permanent magnet are sequentially deposited beneath the current contacts and adjacent to the stack of magnetoresistive sensor layers.

12. The method of claim 4 wherein a bottom shield layer and a bottom gap layer are sequentially deposited prior to the deposit of the stack of magnetoresistive sensor layers.

13. The method of claim 12 wherein the bottom shield layer and the bottom gap layer remain when exposed first region of the stack of magnetoresistive sensor layers is removed.

14. A method of forming a magnetoresistive reader with planar top shield topography and low parasitic resistance, the method comprising:
defining a stripe height back edge of a magnetoresistive sensor of the magnetoresistive reader, wherein defining the stripe height back edge of the magnetoresistive sensor of the magnetoresistive reader comprises:
depositing a stack of magnetoresistive sensor layers;
selectively patterning a first photoresist layer on the stack of magnetoresistive sensor layers, the first photoresist layer serving to define a stripe height back edge of the magnetoresistive sensor by leaving exposed a first region of the stack of magnetoresistive sensor layers;
removing the exposed first region of the stack of magnetoresistive sensor layers; and
removing the first photoresist layer; and
subsequently defining a physical reader width of the magnetoresistive sensor, wherein defining the physical reader width of the magnetoresistive sensor comprises:
selectively patterning a second photoresist layer on the stack of magnetoresistive sensor layers, the second photoresist layer serving to define a reader width of the magnetoresistive sensor by leaving exposed a second region of the stack of magnetoresistive sensor layers; and
removing the exposed second region of the stack of magnetoresistive sensor layers.

15. The method of claim 14 and further comprising:
depositing current contacts such that the current contacts are in electrical contact with opposite edges of the stack of magnetoresistive sensor layers;
removing the second photoresist layer; and
lapping an air bearing surface of the magnetoresistive sensor to define a stripe height front edge of the magnetoresistive sensor.

16. The method of claim 15 and further comprising:
backfilling an insulating material into the removed first region prior to the removal of the first photoresist layer.

17. The method of claim 16 wherein the insulating material is $Al_2O_3$.

18. The method of claim 16 wherein the insulating material is deposited to a thickness similar to a thickness of the stack of magnetoresistive sensor layers, such that the insulating layer survives the step of removing the exposed second region.

19. The method of claim 15 wherein a top surface of the current contacts is substantially level with a top surface of the stack of magnetoresistive sensor layers.

20. The method of claim 15 and further comprising:
depositing a top gap layer on the current contacts and on the stack of magnetoresistive sensor layers; and
depositing a top shield layer on the top gap layer.

21. The method of claim 20 wherein the top shield layer is substantially planar.

22. The method of claim 15 wherein a pedestal, a permanent magnet seed, and a permanent magnet are sequentially deposited beneath the current contacts and adjacent to the stack of magnetoresistive sensor layers.

23. The method of claim 15 wherein a bottom shield layer and a bottom gap layer are sequentially deposited prior to the deposit of the stack of magnetoresistive sensor layers.

24. The method of claim 23 wherein the bottom shield layer and the bottom gap layer remain when exposed first region of the stack of magnetoresistive sensor layers is removed.

* * * * *

UNITED STATES PATENT AND TRADEMARK OFFICE
CERTIFICATE OF CORRECTION

PATENT NO. : 7,587,809 B2 Page 1 of 1
APPLICATION NO. : 10/050236
DATED : September 15, 2009
INVENTOR(S) : Dimitrov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Twenty-first Day of September, 2010

David J. Kappos
*Director of the United States Patent and Trademark Office*